May 25, 1948.  C. SWIFT  2,442,316
SYNCHRONOUS ELECTRIC MOTOR
Filed April 9, 1947
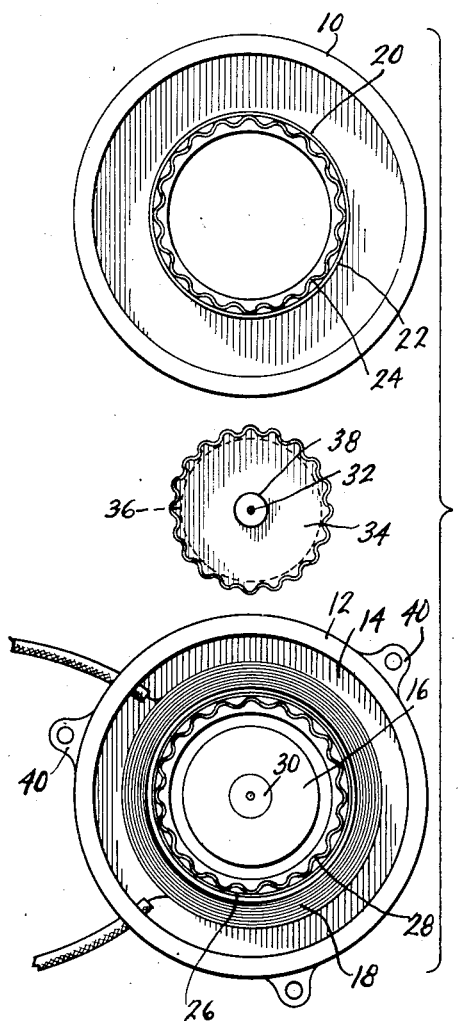
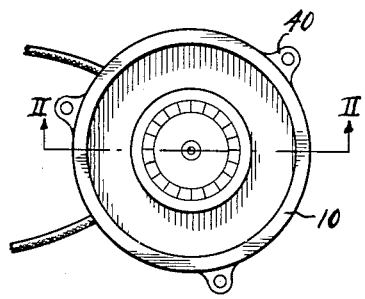
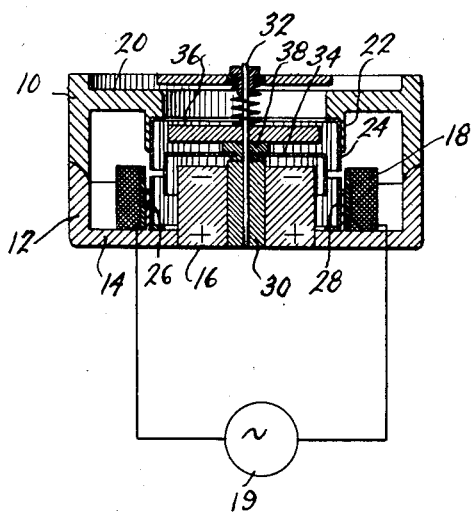
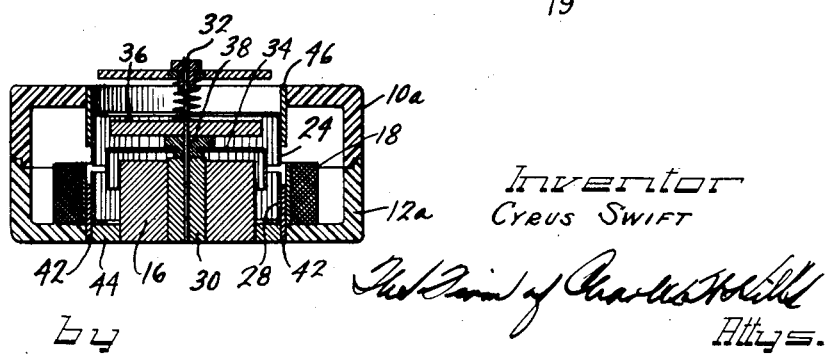
Inventor
Cyrus Swift
by
Attys.

Patented May 25, 1948

2,442,316

UNITED STATES PATENT OFFICE 2,442,316

SYNCHRONOUS ELECTRIC MOTOR

Cyrus Swift, Chicago, Ill.

Application April 9, 1947, Serial No. 740,412

12 Claims. (Cl. 172—278)

My invention relates to synchronous motors of the inductor type and its object is to provide an efficient, low-speed, self-starting, quiet operating motor particularly adapted to be built in fractional horsepower sizes, for the operation of timing devices such, for example, as clocks, phonographs and the like.

A further object of my invention is to provide an improved synchronous motor of the inductor type having features of construction, combination and arrangement wherein simple and easily produced parts may be used to the end that the cost of construction thereof is minimized.

Further it is an object of my invention to provide an improved synchronous motor of the inductor type wherein cost is reduced by the use of parts having identical construction.

It is yet another object of my invention to provide an improved rotor element for inductor type synchronous motors which is adapted to be produced by low cost stamping operations.

The features of my invention which are believed to be novel and patentable will be pointed out in the claims appended hereto. For a better understanding of my invention reference is made to the following description, taken in connection with the accompanying drawings.

On the drawings:

Figure 1 is a top view of a completed motor constructed in accordance with my invention;

Figure 2 is a cross-sectional view taken through the axis II—II of Figure 1;

Figure 3 is a view showing the various component elements of the motor of Figure 1; and Figure 4 is a cross-sectional view like Figure 2 but showing a modified form of the present invention employing a plastic casing structure.

As shown on the drawings:

The motor of my invention includes an upper stator element 10 which is stamped of steel or other high permeability material. This element engages lower stator element 12 which is constructed of similar material and is likewise stamped. Lower stator element 12 includes an inwardly extending portion 14 which is provided with an opening to receive permanent magnet 16, the magnet 16 being disposed so that its magnetic field extends in direction perpendicular to the plane of inwardly extending portion 14 of lower stator element 12. Solenoid 18 is wound about magnet 16 so as to produce a magnetic field in direction corresponding to the direction of a magnetic field of magnet 16. Solenoid 18 is connected to a source of alternating electromotive force shown schematically at 19.

Upper stator element 10 is provided with inwardly extending portion 20 which has downwardly extending portion 22 to receive the upper stator 24. The inwardly extending portion of lower stator element 12 is provided with an upwardly extending portion 26 adapted to receive lower stator 28. In addition, magnet 16 contains bearing 30 in which shaft 32 rides. Upon this shaft are mounted rotor 34 and flywheel 36. Upper stator 24, lower stator 28 and rotor 34 are made of relatively high permeability material, such as steel.

The construction of upper stator 24, lower stator 28, and rotor 34 will be evident from examination of the cross-section view of Figure 2 and the plan views of Figure 3. In the latter figure, the upper stator element 10 is lifted off the lower stator element 12 and faces upwardly and the rotor 34 removed from the stator and likewise faces upwardly. It will be apparent that each of these elements is of cylindrical shape having an inwardly extending flange. In the case of rotor 34, this flange extends to the point where it is engaged by support 38 which is attached to shaft 32, thereby supporting rotor 34 relative to shaft 32. In the case of upper stator 24 and lower stator 28 the inwardly extending portions are of relatively narrow annular shape and merely engage the correspondingly recessed portions 22 and 26 of upper stator element 10 and lower stator element 12 respectively.

The shape of lower stator 28, upper stator 24, and rotor 34 is such that as a periphery of these elements is traversed, periodic variations in radius are encountered. That is, these elements have the wavy configurations shown in the plan view of Figure 3. From the view of Figure 2, it will be evident that rotor 34 overlaps upper stator 24 in the direction of shaft 32 to substantially the same extent that it overlaps lower stator 28.

Mounting flanges 40 are provided for lower stator element 12 to permit convenient mounting of the motor on the support provided for this purpose.

The operation of the motor of this invention may best be understood by reference to the paths of the two flux components in the motor. The first of these components is the unidirectional flux associated with permanent magnet 16 and follows two paths. One of these paths is from the upper surface of magnet 16 through a downwardly extending portion of rotor 34 and the lower stator 28 to the bottom portion of magnet 16. The second flux path is from the upper portion of magnet 16 through rotor 34 and through the upper stator 24, the upper stator element 10, and lower stator element 12 to the lower portion of magnet 16. The path for flux associated with alternating current flow in solenoid 18 is from lower stator 28 to rotor 34 and therefrom to upper stator 24. From upper stator 24 the flux passes through upper stator element 10 and lower stator element 12 to lower stator 28 to complete the circuit. It will be observed that the flux associated with a unidirectional field due to magnet 16 is always in the same direction between rotor 34 and stators 24 and 28 whereas the alternating flux passes from stator 28 to rotor 34 and from stator 24 to rotor 34 in opposite directions.

In operation, the flux associated with passage of alternating current through coil 18 alternately supports and opposes the flux from magnet 16 between rotor 34 and stator 28 and between stator 24 and rotor 34. Thus there is first set up additional flux between rotor 34 and stator 24 so as to cause the points of maximum radius of rotor 34 to line up with points of minimum radius of stator 24. On the next half cycle of alternating current flow in coil 18, the flux between rotor 34 and stator 28 is increased, thereby causing the points of maximum radius of rotor 34 to line up with points of minimum radius of stator 28. However, stators 24 and 28 are rotated relative to each other by a small amount so that in going from the position wherein points of maximum radius of rotor 34 line up with the points of minimum radius of stator 24 to the position where the points of maximum radius of rotor 34 line up with the points of minimum radius of stator 28, the rotor 34 rotates. Due to the symmetrical construction of stator elements 24 and 28 and rotor 34, the next half cycle of alternating current requires further motion of rotor 34 in the same direction, thus causing continuous rotor motion.

It will be apparent from the above description that the torque applied to rotor 34 by reason of the operation of the motor is pulsating. The effect of these variations on the operation of the motor is reduced by providing flywheel 36 which has a relatively great inertia and maintains substantially constant velocity motion despite the torque variation.

Figure 4 shows a modified form of the present invention wherein a plastic casing comprising members 10a and 12a is substituted for the upper and lower stator elements 10 and 12 of Figure 2. As will be evident from Figure 4, lower stator 28 is mounted within pipe section 42 which is of iron or other magnetic material and is retained in the lower plastic casing portion 12a. A ring or washer 44 of iron or other magnetic material frictionally engages the inner side of pipe 42 and the lower end of the outer periphery of magnet 16, thus holding these elements in fixed position relative to each other. The upper stator element 24 is sustained by upper pipe section 46 which is supported by the plastic casing section 10a.

It will be evident from comparison of Figures 2 and 4 that the alternate embodiment of my invention shown in Figure 4 differs from that of Figure 2 primarily in that the plastic casing comprising elements 10a and 12a is substituted for the high permeability upper and lower stator elements 10 and 12. It will be evident to those skilled in the art that this construction is considerably less expensive than the structure shown in Figure 2, since the plastic part may be cheaply molded.

Operation of the embodiment of the present invention shown in Figure 4 is like that of the embodiment of Figure 2 except that the plastic casing including elements 10a and 12a has unity magnetic permeability and hence does not provide a low reluctance flux path about coil 18. However, I have found that this structure works quite satisfactorily and the shaft 32 rotates in the same manner as in the case of the structure of Figure 2 when alternating voltage is applied to coil 18. This is apparently due to the fact that sufficient flux exists to produce the necessary torque on the rotor in the low torque applications to which the motor has been applied.

A particularly important feature of my invention resides in the construction of rotor element 34 and stator elements 24 and 28 so that they may be manufactured by stamping operations. This permits relatively inexpensive construction of my motor despite the complicated casing that might seem to be required. It is further possible to use stampings for lower stator 12 and upper stator 10 so as to avoid entirely the need for machined parts and the consequent expensive construction.

In accordance with the provisions of the patent statutes I have described the principles of operation of my invention, together with the apparatus which I now consider to represent the best embodiment thereof, but I desire to have it understood that the apparatus shown is only illustrative and that the invention may be carried out by other means. In particular, the rotor construction of my invention may be utilized on reluctance type motors of other constructions than that specifically shown herein, and many of the advantages of my invention thereby secured.

What I claim as new and desire to secure by Letters Patent in the United States is:

1. An electric motor comprising in combination a solenoid, a magnet disposed within said solenoid and having a magnetic field coaxial with the magnetic field of said solenoid, a casing of relatively high permeability material forming a magnetic circuit about said solenoid and passing between said solenoid and said magnet, said circuit having an air gap in substantial alignment with one end of said magnet, said casing being of cylindrical shape in the regions immediately above and below said air gap and having periodic variations in radius as the periphery thereof is traversed, and a rotor element of relatively high permeability disposed between said magnet and said casing in the region of said gap, said rotor being of cylindrical shape having periodic variations in radius as its periphery is traversed, the variations in radius of said regions of said casing being angularly displaced relative to each other so that application of alternating voltage to said solenoid produces torque on said rotor.

2. An electric motor comprising in combination, a solenoid, a magnet disposed within said solenoid and having a magnetic field coaxial with the magnetic field of said solenoid, a casing of relatively high permeability material forming a magnetic circuit about said solenoid and passing between said solenoid and said magnet, said circuit having an air gap substantially aligned with one end of said magnet, said casing being of cylindrical shape in the regions immediately above and below said air gap and each of said regions having periodic variations in radius as the periphery thereof is traversed, a rotor element of relatively high permeability material disposed between said magnets and said casing in the region of said gap, said rotor being of cylindrical shape having periodic variations in radius as its periphery is traversed, the variations in radius of said regions of said casing being angularly displaced relative to each other so that application of alternating voltage to said solenoid causes rotation of said rotor, and a flywheel on said rotor to limit variations in the angular velocity thereof.

3. An electric motor comprising in combination a rotor and a pair of stators mounted coaxially therewith, said rotor comprising a cylindrically shaped member having recurrent variations in radius as its periphery is traversed and said stators having recurrent variations in radius as their peripheries are traversed, said stators and said rotor being of relatively high permeability material, one of said stators being telescoped with the upper portion of said rotor and the other of said stators being telescoped with the lower portion of said rotor, and means operable alternately to produce greater magnetic flux between one of said stators and said rotor and between the other of said stators and said rotor, the recurrent variations in radius of said stators being angularly displaced relative to each other so as to cause rotation of said rotor.

4. An electric motor comprising in combination a rotor and a pair of stators mounted coaxially therewith, said rotor comprising a stamping having a flange and an axially extending cylindrical portion with recurrent variations in radius as its periphery is traversed and said stators having recurrent variations in radius as their peripheries are traversed, said stators and said rotor being of relatively high permeability material, one of said stators being telescoped with the upper portion of said rotor and the other of said stators being telescoped with the lower portion of said rotor, and means operable alternately to produce greater magnetic flux between said one stator and said rotor and between said other stator and said rotor, the recurrent variations in radius of said stators being angularly displaced relative to each other so as to cause rotation of said rotor.

5. An electric motor comprising in combination a rotor and a pair of stators mounted coaxially therewith, said rotor comprising a cylindrically shaped member having recurrent variations in radius as its periphery is traversed and said stators having recurrent variations in radius as their peripheries are traversed, one of said stators being telescoped with the upper portion of said rotor and the other of said stators telescoped with the lower portion of said rotor, said stator and said rotors being of relatively high permeability material, and means operable alternately to produce greater magnetic flux between one of said stators and said rotor than between the other of said stators and said rotor, the recurrent variations in radius of said stators being angularly displaced relative to each other so as to cause rotation of said rotor, said means including means to produce a unidirectional magnetic field between said rotor and said stators and means to produce an alternating magnetic field between said stators.

6. An electric motor comprising in combination a rotor and a pair of stators mounted coaxially therewith, said rotor comprising a stamping having a flange and an axially extending cylindrical portion with recurrent variations in radius as its periphery is traversed and said stators having recurrent variations in radius as their peripheries are traversed, one of said stators being telescoped with the upper portion of said rotor and the other of said stators being telescoped with the lower portion of said rotor, said stators and said rotors being of relatively high permeability material, and means operable alternately to produce greater magnetic flux between one of said stators and said rotor than between the other of said stators and said rotor, the recurrent variations in radius of said stators being angularly displaced relative to each other so as to cause rotation of said rotor, said means including means to produce a unidirectional magnetic field between said rotor and said stators and means to produce an alternating magnetic field between said stators.

7. In an electric motor, a cup-shaped rotor of material of relatively high permeability having a skirt portion with periodic variations in radius as its periphery is traversed, a pair of oppositely disposed cup-shaped stator elements of material of relatively high permeability each having an axially extending skirt portion having periodic variations in radius as its periphery is traversed, means mounting said stator elements coaxially with said rotor element and with their periodic variations in radius angularly displaced relative to each other, a magnet core to engage said stator elements to provide a flux path therebetween, a permanent magnet mounted coaxially with said rotor and having one end adjacent the ends of said stator elements and the other end magnetically connected to said core, and a solenoid disposed to produce flux in said core so that application of alternating electromotive force thereto causes rotation of said rotor.

8. An electric motor comprising a pair of oppositely disposed cup-like frame members of relatively high permeability material, a pair of oppositely disposed cup-like stators, each having a skirt portion with periodic variations in radius as its periphery is traversed, said frame members having recesses snugly to receive said stators so that they are mounted in coaxial relation with an intervening air gap, said stators being of relatively high permeability material, a rotor element of relatively high permeability material mounted coaxially with said stators, said rotor being of cylindrical shape with periodic variations in radius as its periphery is traversed and being mounted in axial alignment with the gap between said stators, a permanent magnet mounted coaxially with said rotor with one end mounted in one of said frame members and the other end axially aligned with the gap between said stators, and a solenoid mounted within said frame members but outside said stators, said stators being disposed so that their periodic variations in radius are angularly displaced so that application of alternating electromotive force to said solenoid rotates said rotor.

9. An electric motor comprising in combination a rotor and a pair of stators mounted coaxially therewith, said rotor comprising a cylindrically shaped member having a smoothly varying radius from a minimum and a maximum value as its periphery is traversed and said stators having smoothly varying radii from a minimum to a maximum value as their peripheries are traversed, said stators and said rotor being of relatively high permeability material, one of said stators being telescoped with the lower portion of said rotor, and the other of said stators being telescoped with the upper portion of said rotor, and means operable alternately to produce greater magnetic flux between one of said stators and said rotor than between the other of said stators and said rotor, the variations in radius of said stators being angularly displaced relative to each other so as to cause rotation of said rotor.

10. An electric motor comprising in combination a solenoid, a magnet disposed within said solenoid and having a magnetic field coaxial with the magnetic field of said solenoid, elements defining a magnetic flux path within said solenoid, said path having an air gap in substantial alignment with one of said magnet, said elements being of cylindrical shape in the sections immediately above and below said air gap and having periodic variations in radius as the peripheries thereof are traversed, and a rotor of relatively high permeability material disposed in telescoping relation with said elements, said rotor being of cylindrical shape having periodic variations in radius as its periphery is traversed, the variations in radius of said elements being angularly displaced relative to each other so that the application of alternating voltage to said solenoid produces torque on said rotor.

11. An electric motor comprising in combination a solenoid, a magnet disposed within said solenoid and having a magnetic field coaxial with the magnetic field of said solenoid, elements defining a magnetic flux path passing between said solenoid and said magnet, said elements having an air gap in substantial alignment with one end of said magnet, said elements being of cylindrical shape in the regions immediately above and below said air gap and having periodic variations in radius as the peripheries thereof are traversed, and a rotor element of relatively high permeability material disposed between said magnet and said casing in the region of said gap, said rotor being of cylindrical shape having periodic variations in radius as its periphery is traversed, the variations in radius of said region of said casing being angularly displaced relative to each other so that application if alternating voltage to said solenoid produces torque on said rotor, and a casing of plastic or the like disposed to support said elements and to form an enclosure for said solenoid.

12. An electric motor comprising two members of relatively high permeability material having aligned cylindrical cavities with periodic variations in radius as their peripheries are traversed, a rotor of relatively high permeability material having a cylindrical portion of smaller diameter than the diameter of said cavities and having periodic variations in radius as its periphery is traversed, said rotor being positioned in telescoping relationship with said members, means defining a magnetic circuit between said members, a solenoid linking said circuit, and means to produce a uni-directional magnetic field between said rotor and said members, the variations in radius of the cavities of said members being angularly displaced relative to each other to cause torque on said rotor when said solenoid is energized with alternating electromotive force.

CYRUS SWIFT.

REFERENCES CITED

The following references are of record in the file of this patent:

UNITED STATES PATENTS

| Number | Name | Date |
|---|---|---|
| 1,440,729 | French | Jan. 2, 1923 |